United States Patent [19]

Cusack

[11] Patent Number: 4,734,994

[45] Date of Patent: Apr. 5, 1988

[54] PROBE HAVING A PLURALITY OF HINGED PLATES

[75] Inventor: Robert F. Cusack, Grosse Pointe Park, Mich.

[73] Assignee: GTE Valeron Corporation, Troy, Mich.

[21] Appl. No.: 944,788

[22] Filed: Dec. 22, 1986

[51] Int. Cl.⁴ ............................................. G01B 7/00
[52] U.S. Cl. .................................. 33/561; 33/172 E
[58] Field of Search ................. 33/169 R, 172 E, 503, 33/558, 559, 560, 561

[56] References Cited

U.S. PATENT DOCUMENTS

| | | | |
|---|---|---|---|
| 3,945,124 | 3/1976 | Jacoby et al. | 33/561 |
| 4,451,987 | 6/1984 | Cusack | 33/561 |
| 4,535,543 | 8/1985 | Linder | 33/559 |
| 4,553,332 | 11/1985 | Golinelli et al. | 33/561 |
| 4,562,646 | 1/1986 | Dall'Aglio | 33/561 |
| 4,621,436 | 11/1986 | Kurimoto | 33/561 |

Primary Examiner—Richard R. Stearns
Attorney, Agent, or Firm—Robert E. Walter

[57] ABSTRACT

A stack of hinged plates are employed as part of a switch assembly for a probe used to detect contact with an object such as a workpiece. In the preferred embodiment, the plates are hinged together by flat springs clamped to, but electrically insulated from, side walls of adjacent plates.

16 Claims, 3 Drawing Sheets

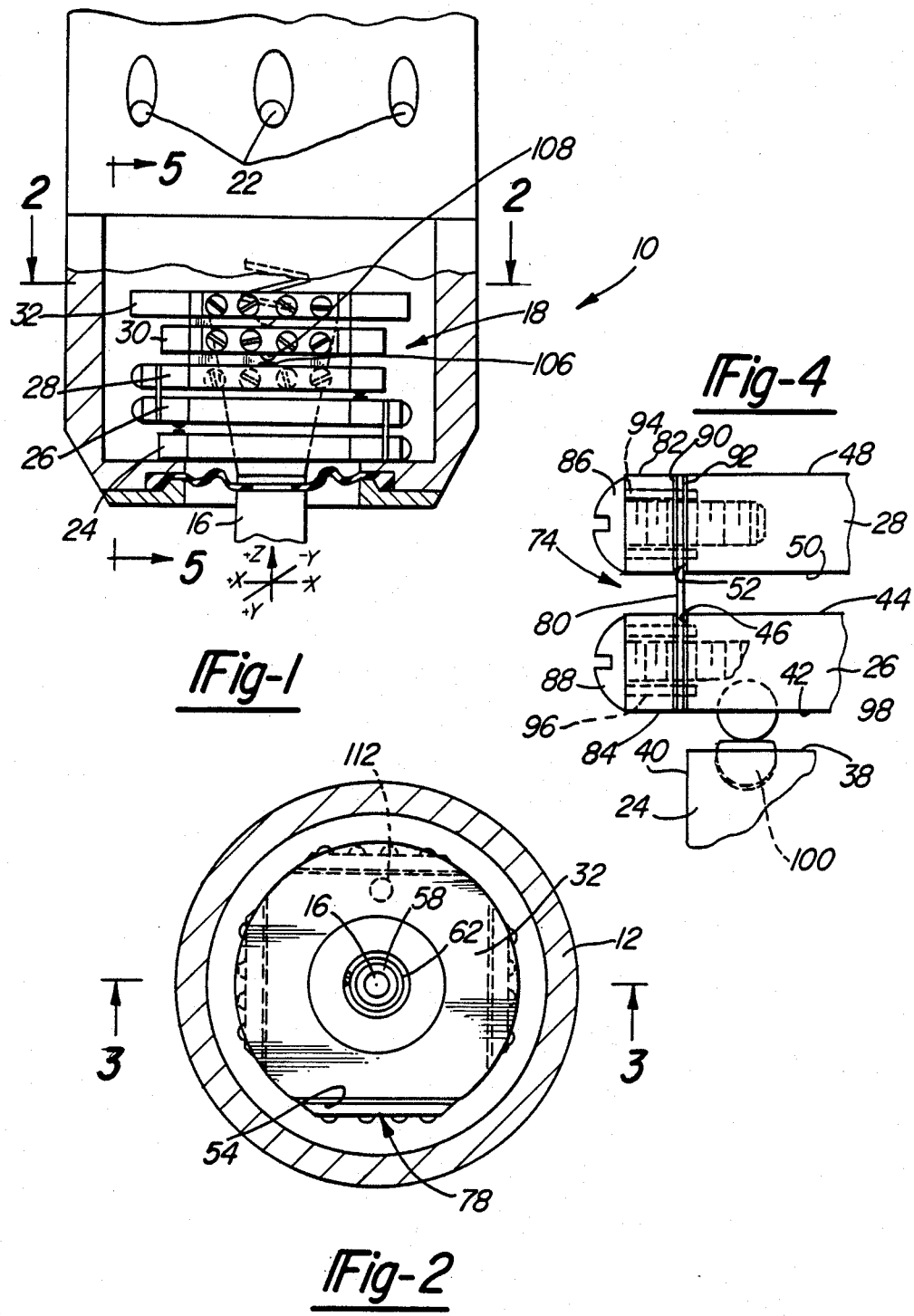

PROBE HAVING A PLURALITY OF HINGED PLATES

BACKGROUND OF THE INVENTION

1. Technical Field

This invention relates to inspection devices and, more particularly, to probes having a moveable stylus used to detect contact with an object such as a workpiece.

2. Background

Probes are often used by automated machine tool systems for purposes of detecting dimensional information about workpieces. Some of the known probes are referred to as touch probes in that they operate to transmit a signal to the machine controller when a probe stylus touches the workpiece. In general, touch probes include an industry standard shank portion located opposite the stylus so that the probe can be inserted into the machine in the same manner as the tools that actually remove metal from the workpiece. In use, the machine moves the probe relative to the workpiece until the stylus contacts the workpiece thereby removing the stylus from its rest position. The machine controller stores the X, Y and Z axes position of the probe stylus in its memory when the signal is received from the probe indicating that the stylus has contacted the workpiece. By touching the workpiece at several locations it is possible to calculate dimensions of the workpiece. This process is often referred to as "in-cycle gaging". Examples of some touch probe constructions are found in U.S. Pat. Nos. 4,535,543 to Linder; 4,553,332 to Golinelli et al and U.S. Pat. No. 4,562,646 to Dall'Aglio.

It is highly desirable for probes of this types to be rugged, permit a generous amount of stylus overtravel and still provide highly accurate repeatable measurements. The term "stylus overtravel" means the distance the stylus can be displaced from its rest position without harming the future repeatability of the probe. The need for good overtravel characteristics is due, for example, because the inertia of the machining tool often carries, the probe past the location where the stylus initially touches the workpiece under inspection. Thus, the stylus can be displaced by a relatively large degree and it is desirable for the probe to be capable of tolerating as much "overtravel" as possible without impairing characteristics of the probe components such as their elastic limits and the like which could degrade the accuracy of the probe. Of course, it would be very advantageous if these objectives can be met while at the same time permitting easy and economical manufacturing of the probe from both a labor and materials standpoint. It is believed, however, that some of the probe constructions of the prior art do not lend themselves to fulfilling these goals.

SUMMARY OF THE INVENTION

Pursuant to the present invention, a probe is provided that can be relatively easily manufactured yet provide highly desirable probe characteristics. The probe design of the preferred embodiment of this invention employs a plurality of stacked plates which are moveable relative to one another. A stylus is connected to one of the plates and means are provided for detecting displacement of the stylus from a given rest position. The plates are hinged together by springs that are physically connected to but electrically insulated from side walls of adjacent plates. Contact elements on the plates can be easily connected together in a series electrical circuit as part of the means for detecting stylus movement. Since the hinge springs are electrically insulated from the plates, the plates can be used as part of the electrically conductive path for connecting the contact elements together.

BRIEF DESCRIPTION OF THE DRAWINGS

These and various other advantages of the present invention will become apparent to those skilled in the art upon a study of the following specification and by reference to the drawings in which:

FIG. 1 is a partial cross-sectional view of a probe made in accordance with the teachings of the present invention;

FIG. 2 is a cross-sectional view taken along the lines 2—2 of FIG. 1;

FIG. 4 is an enlarged fragmentary side view of a hinge construction used in the preferred embodiment;

DESCRIPTION OF THE PREFERRED EMBODIMENT

Figure 3:
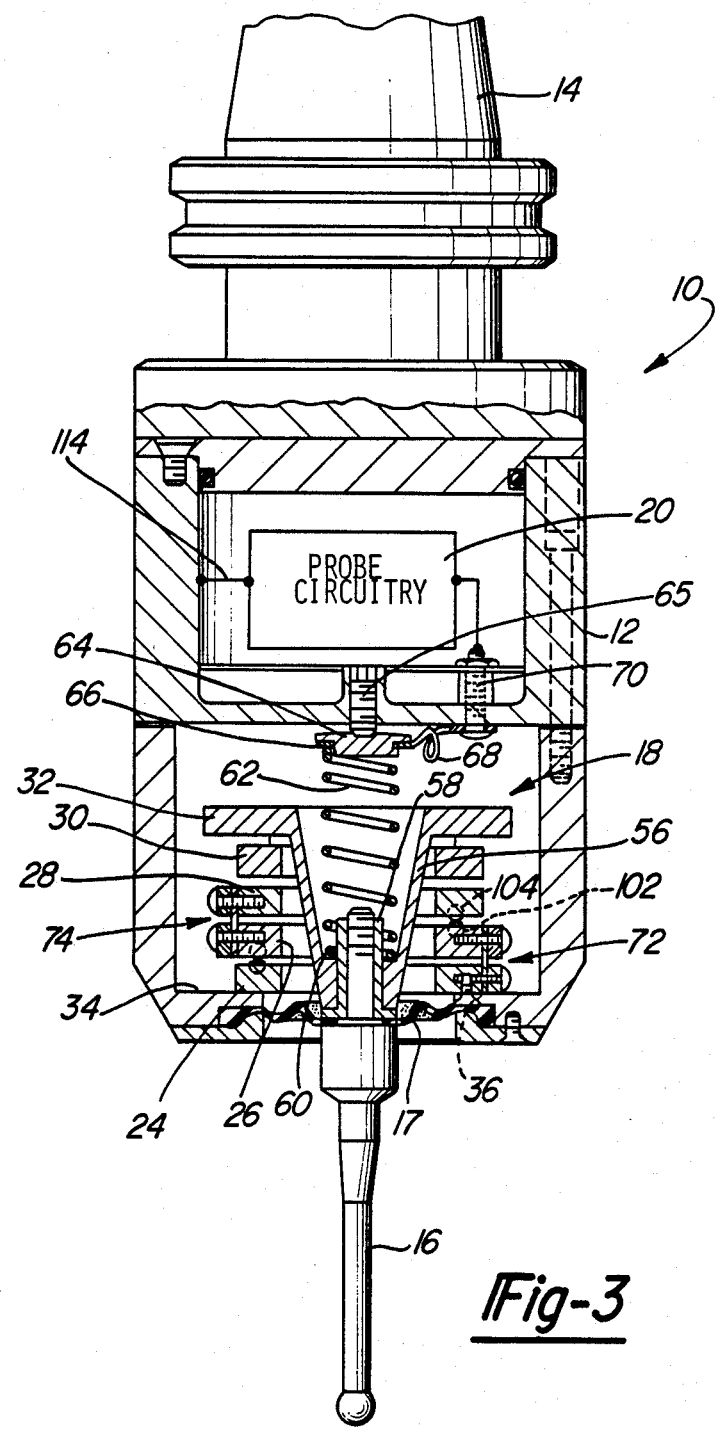
FIG. 3 is a partial cross-sectional view as viewed along the lines 3—3 of FIG. 2.
Figure 5:
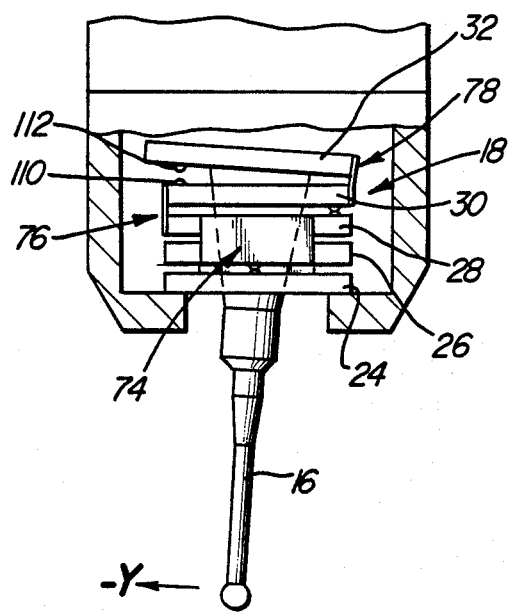
FIG. 5 is a diagrammatic illustration showing the probe (as viewed along the lines 5—5 of FIG. 1) when the stylus is displaced in the −Y axis direction as defined by the coordinate system depicted in FIG. 1.
Figure 6:
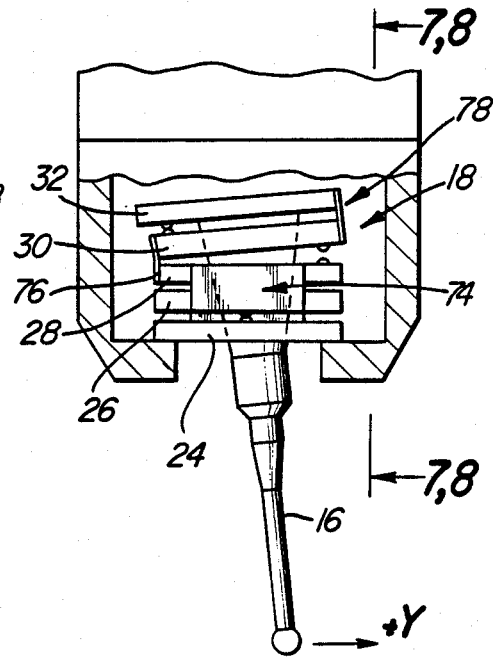
FIG. 6 is a view similar to FIG. 5 illustrating the probe when the stylus is displaced in the +Y axis direction.
Figure 7:
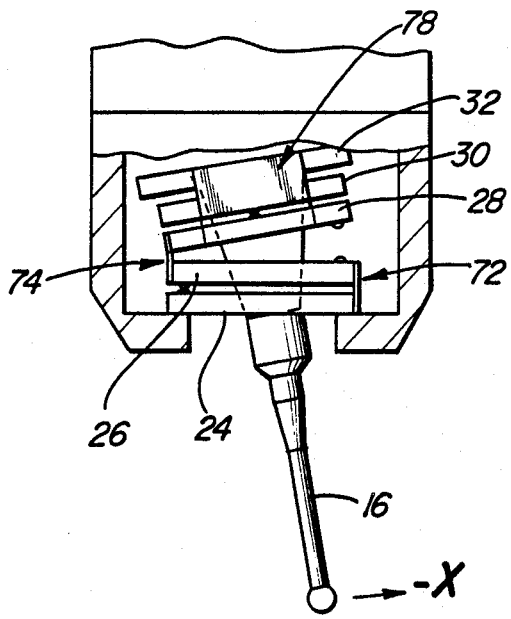
FIG. 7 is a cross-sectional view of the probe as viewed along the lines 7,8—7,8 of FIG. 6 when the stylus is displaced in the −X axis direction.
Figure 8:
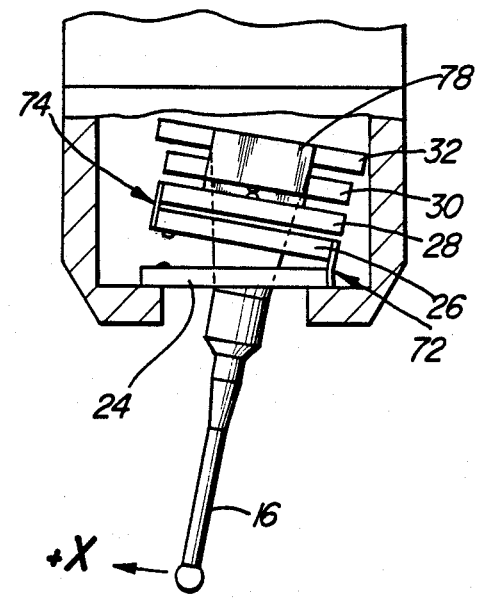
FIG. 8 is a view similar to FIG. 7 illustrating the probe when the stylus is displaced in the +X axis direction.

With special reference to FIGS. 1-3, probe 10 includes a conductive housing 12 having an industry standard shank or taper portion 14 at one end thereof and a stylus 16 projecting from the opposite end thereof through a protective diaphragm 17. Probe 10 has a major axis which is defined by the longitudinal axis of stylus 16. As is known in the art, shank portion 14 conforms to the shape of shanks whose opposite ends carry tool bits that actually perform machining operations on the workpiece. Shank 14 is designed to be inserted into a spindle of a machining center. However, it should be understood that the present invention has applicability to a wide variety of inspection operations in other types of machines such as turning centers, coordinate measuring machines and the like.

The probe housing 12 is divided into two compartments; a compartment which contains a switch assembly 18 and a separate compartment which contains probe circuitry 20. Briefly, the switch assembly 18 defines a rest position for the stylus 16 while the probe circuitry 20 is used to transmit a signal to a remote receiver (not shown) upon detection of movement of the stylus 16 from that rest position. In this embodiment, probe circuitry 20 is used to drive a plurality of infrared light emitting diodes 22 spaced 360 degrees around the periphery of the probe housing 12, as seen most clearly in FIG. 1. An example of suitable probe circuitry for performing these functions is disclosed in U.S. Pat. No. 4,509,266, issued Apr. 9, 1985 to Cusack, which is hereby incorporate by reference. However, the primary focus of the present invention is in the construction of the switch assembly 18.

The switch assembly 18 includes a stack of a plurality of axially spaced, transversely extending electrically conductive plates, five of which are shown in the drawings bearing references numerals 24, 26, 28, 30 and 32. For ease in description, the terms inner/outer and vertical/horizontal used in connection with the specification and claims of this invention will be in reference to the probe orientation shown in FIG. 3. The outermost plate 24 is electrically and mechanically secured to a transversely extending probe housing reference surface 34. This connection can be made in a variety of different ways such as by the provision of screws which extend parallel to the probe axis, one of which is shown in FIG. 3 bearing reference numeral 36.

Plates 24, 26, 28 and 30 are substantially identical in shape, each being essentially square with beveled corners. Thus, they each include upper and lower flat major surfaces extending transverse to the probe axis and side walls which generally parallel the probe axis. In FIG. 4 the surfaces are labeled: plate 24 having upper major surface 38 and side walls 40; plate 26 having lower major surface 42, upper major surface 44 and side wall 46; and plate 28 including upper surface 48, lower surface 50 and side wall 52.

As can be seen most clearly in FIGS. 2 and 3, the uppermost plate 32 has a generally circular shape except for one flat side wall 54 to which the hinge connection to the adjacent plate is made, as will be described in more detail later herein. With special reference to FIG. 3, the innermost plate 32 includes a generally centrally located nose portion 56 which extends through openings in the four other plates 24, 26, 28 and 30. The interior of nose portion 56 includes an internally threaded boss 58 for receiving stylus 16. This boss 58 is electrically insulated from the nose portion 56. The space between boss 58 and the upwardly diverging walls of the nose portion 58 define a seat 60 for receiving one end of a compression spring 62. The upper end of spring 62 is received by a fixed reference surface of the probe housing which, in the preferred embodiment, is defined by a button 64 having an annular electrically conductive washer 66 surrounding an upstanding shoulder on the button which pilots the circular spring end. The axial spacing of button 64 is defined by a set screw 65 to thereby permit adjustment of the bias pressure provided by spring 62 to the switch assembly 18. Electrical connection is provided between the washer 66 and the probe circuitry 20. In this embodiment, this is provided by way of a wire 68 connected at its opposite end to a screw 70 passing through the wall of the probe housing dividing the switch assembly and probe circuitry compartments. The screw 70 is electrically insulated from the probe housing.

Special attention should now be drawn to the hinge construction that permits relative movement between adjacent plates so as to permit stylus movement along the +X and −X, +Y and −Y, and +Z axes as defined in the coordinate system shown in FIG. 1.

There is one hinge provided between adjacent plates: hinge 72 between the side walls of plates 24 and 26; hinge 74 between plates 26 and 28; hinge 76 between plates 28 and 30; and hinge 78 between plates 30 and 32. Each hinge is substantially identical. Consequently, only the hinge 74 shown in FIG. 4 will be described in detail. Hinge 74 is defined by a flexure member that is preferably electrically insulated from the two plates that it bridges. In the preferred embodiment, the flexure member takes the form of a generally rectangular shaped reed or flat spring 80 which bridges side walls 46 and 52 of plates 26 and 28, respectively. Spring 80 is clamped to the side walls of the respective plates by way of clamping members 82 and 84 which are screwed into the plates by suitable fasteners such as screws 86 and 88, respectively.

Provision is made to electrically insulate the hinge from the plates. To this end, shims made of electrically insulated material are provided on either side of spring 80. For example, shim 90 is located between clamping member 82 and spring 80 while shim 92 is loated between spring 80 and the plate side wall 52. A similar arrangement of insulative shims is provided for the other spring/plate hinge connections. To insulate the screws 86, 88 from the spring 80, enlarged openings are provided in the spring to allow the shanks of the screws to pass therethrough and insulator collars 90, 92 are provided for ensuring electrical insulation between the shanks of the screws 86 and 88, respectively, and the spring 80.

The probe also is provided with means for detecting movement of the stylus from its rest position. The detection means can take a variety of forms such as suitable transducers which provide an output proportional to the displacement of the stylus. Alternatively and as illustrated in these drawings, the detection means can be designed to provide a binary or on/off signal that has two states; namely, a signal indicating that the stylus is in the rest position and another signal indicating that the stylus is not in the rest position. In the preferred embodiment, this is accomplished by a plurality of aligned pairs of switch contact elements. The contact elements are connected together in series and are closed when the stylus is in its rest position. However, as soon as the stylus touches an object and is moved from its rest position, at least one of the switch contacts open. This change in electrical characteristic of the switch contacts is detected by the probe circuitry 20 which generates an appropriate signal which, in this embodiment, is transmitted via LEDs 22 to a remote receiver.

Each mutually adjacent face of the plates 26-32 is provided with a contact element. For example, plate 26 is provided with a spherical or ball-shaped contact element 98 which opposes a generally flat surface on contact element 100 disposed in plate 24 as can be seen most clearly in FIG. 4. As can be seen most clearly perhaps in FIG. 2, each pair of contact elements are arranged on their respective plates on an opposite side of the stylus 16 from the hinge which connects their respective plates together. Due to the electrical insulation of the hinge construction from the plates which would otherwise short circuit the contact element switches, it becomes an easy task to connect each of the contact elements in series with each other and eventually to the probe circuitry 20. The series electrical circuit is defined as follows: the probe housing 12 is considered as a ground reference and it is mechanically and electrically connected to the lowermost surface of plate 24 by way of screw 36 as described above. Since the plates are all electrically conductive (in the preferred embodiment made of aluminum) the contact element 100 is also connected to the reference ground through plate 24. Contact element 98 which abuts contact element 100 is connected through plate 26 to contact element 102 in an upper surface of plate 26, which, in turn, is connected to abutting contact element 104 in the lower surface of plate 28. Contact element 104 is electrically connected through plate 28 to the contact element 106 on the upper surface of plate 28 which abuts contact element 108 on the lower plate of plate 30. Contact element 108 is connected through plate 30 to contact element 110 on the upper surface of the plate which abuts contact element 112 on a lower surface of the innermost plate 32. Thus, the contact elements are all connected together in a series circuit. This series circuit is connected to the probe circuitry 20 by way of the electrically conductive spring 62 which is mechanically and electrically connected to the innermost plate 32 at seat 60. The upper portion of compression spring 62 is electrically connected to the washer 66 which makes electrical connection to the probe circuitry 20 by way of wire 68 and screw 70. The other side of the probe circuitry 20 can be readily connected to reference ground, i.e., probe housing 12, as represented by line 114.

Thus, it can be appreciated that one of the contact element pairs will be broken upon movement of the stylus 16 in any direction except in the $-Z$ axis direction (stylus movement in this direction being prevented by the illustrated switch assembly construction). The relative movement of the plate in response to stylus movement in the $+X$ and $-X$ and $+Y$ and $-Y$ directions is illustrated in FIGS. 5-8. If the probe is moved in a pure $+Z$ axis direction, then, one or more, if not all, of the contacts are opened.

Those skilled in the art can appreciate that the probe construction of the present invention provides some significant advantages over many of the prior art designs. One of the primary advantages is that the probe can be assembled quite easily. According to the method of this invention, a fixture or jig (not shown) is provided for receiving the switch head assembly 18 before it is mounted to probe housing 12. The plates of the switch head assembly 18 are preferably loosely held together by the hinges but the hinge screws are not tightened. This permits a certain amount of adjustment to be made to the alignment of stylus 16 or, more precisely, the alignment of the boss 56 in the outermost plate to which the stylus is later connectable. With the outermost plate 24 securely connected to a reference surface in the jig, the innermost plate 34 is manually moved until it becomes aligned with a given alignment position. Once the innermost plate 32 is in proper alignment, then the screws can be tightened down to clamp the read springs 80 into position. In such manner, it becomes a relatively easy task to obtain proper stylus aliignment. Once the alignment procedure is completed, it can be removed from the test jig and then secured to the probe housing via screws 36, the compression spring 62 placed into the nose portion of the outermost plate 32 and then the lower probe housing compartment screwed into the upper probe housing compartment to finish the assembly.

Some of the other advantages of the probe construction of the present invention is that the geometries of the individual plates are relatively simple and thus easy to manufacture as compared with some other known designs. The hinge construction likewise facilitates easy assembly since the flat hinge springs are clamped with external clamping members that are easily accessible. The contact elements can be easily mounted in the plates prior to assembling the hinges. In the preferred embodiment, the contact elements are all initially balls which are crimped into a spherical seat previously formed into the plates. The crimping action deforms the material of the plate so as to create a shoulder to hold the contact element in place in the plate. To form a flat contact surface for the element (such as for element 100) the top portion of the ball can be machined off to provide a flat surface.

Still other advantages will become apparent to those skilled in the art. They should include the realization that this probe construction provides a generous amount of overtravel and that the characteristics of the probe can be individually tailored to be user's needs by changing the characteristics of the individual components making up the assembly.

Still other advantages will become apparent to those skilled in the art upon a study of the specification, drawings and following claims.

What is claimed is:

1. In a probe having a plurality of stacked plates moveable relative to one another, a stylus connected to one of the plates, and detecting means for detecting displacement of the stylus from a rest position, the improvement wherein:

the plates are hinged together by flat springs clamped to side walls of adjacent plates, said plates are made of electrically conducting material and said springs are electrically insulated from the plates, with said detecting means including at least one pair of aligned contact elements on opposing surfaces of adjacent plates, with said plates forming part of a series electrical circuit including said contact elements.

2. The improvement of claim 1 wherein further includes a centrally located coil spring for urging said plates together to define a rest position for the stylus, and wherein said coil spring is part of said electrical circuit.

3. A probe having a housing with a major axis defined by a moveable stylus projecting from an outer end thereof, the probe further including means for detecting movement of the stylus from a rest position, said probe comprising:

a fixed reference surface in the probe housing;

a stack of plates in the probe housing, said stack including a first plate connected to the reference surface, the first plate having a major surface extending generally transversely to the major axis of the probe, the first plate having peripheral side walls extending generally parallel to the probe axis, and wherein said first plate further includes an electrical contact element on the major surface of the plate;

said stack further including at least one other plate having a major surface facing said major surface of the first plate, said other plate having peripheral side walls generally paralleling the major probe axis, and said other plate having an electrical contact element in alignment with the contact element in the first plate;

said stylus having an inner end connected to an innermost plate in the stack;

hinge means including a flexure member connected between side walls of adjacent plates thereby permitting relative movement of the plates; and insulator means for electrically insulating the hinge means from the plates.

4. The probe of claim 3 wherein each hinge means comprises:

a flat spring bridging side walls of adjacent plates, and fastener means extending through the spring into the side walls of the plates in a direction transverse to the probe axis.

5. The probe of claim 4 wherein said fastneer means comprises:
a clamping member generally conforming to dimensions of the side wall; and
a plurality of screws extending through the clamping member into the side wall of each plate.

6. The probe of claim 5 wherein said insulator means comprises:
shims made of electrically insulating material, one shim being located between the spring and the clamping member, with another shim being located between the spring and the side wall of the plate.

7. The probe of claim 3 wherein there are a sufficient number of plates and hinge means arranged to permit stylus movement about a plurality of axes.

8. The probe of claim 7 wherein there are five plates.

9. The probe of claim 3 wherein each aligned pair of contact elements are arranged on their respective plates on an opposite side of the stylus from the hinge means which connects the plates together.

10. The probe of claim 3 which further comprises:
probe circuitry for transmitting signals related to stylus position to a remote receiver, said circuitry being coupled to a series circuit including the contact elements by way of connection means between the circuit and the innermost plate.

11. The probe of claim 10 wherein said innermost plate includes a hollowed out nose portion which extends through central openings in the other plates, said nose portion having an internal seat; and
said probe further including bias means having one end resting in the seat and another end abutting a fixed housing surface;
wherein said bias means urges said contact elements together when the stylus is in a rest position and also serves to provide electrical connection between the innermost plate and said probe circuitry.

12. The probe of claim 3 wherein said contact elements are held in their respective plates by a shoulder defined by material of the plate created by crimping a ball into the plate material.

13. A touch probe comprising:
a probe housing having a major axis and a fixed reference surface extending transverse to that axis;
a stack of five electrically conductive plates axially spaced along the major probe axis, each plate having an upper and lower surface extending transverse to the probe axis and having side walls which extend generally parallel to the probe axis, an outermost plate in the stack being mechanically and electrically connected to said probe housing reference surface, mutually opposing major surfaces of the plates having aligned electrical contact elements therein, adjacent plates being hinged together by way of a flat spring bridging side walls thereof, an innermost plate being connected to a stylus which projects through openings in the other plates and extends outwardly from the probe housing; detection means for detecting movement of the stylus from a rest position, said detection means including means for insulating said flat springs from said plates, with said plates forming part of a series electrical circuit including the aligned contact elements whereby the contact elements are opened upon movement of the stylus.

14. The probe of claim 13 wherein said innermost plate includes a hollowed out nose portion which extends through the openings in the other plates, said nose portion having an internal seat; and
said probe further including bias means having one end resting in the seat and another end abutting a fixed probe housing surface;
wherein said bias means urges said contact elements together when the stylus is in a rest position and also serves to provide electrical connection between the innermost plate and said detection means.

15. The probe of claim 13 wherein said probe further includes:
a clamping member for clamping each flat spring to one of the plate side walls, and a plurality of screws extending through the springs into the side walls of the plates.

16. The probe of claim 15 wherein the screws are electrically insulated from the clamping member and the spring by way of an insulative collar.

* * * * *